United States Patent [19]

Crivello

[11] 4,329,306

[45] * May 11, 1982

[54] HEAT CURABLE PROCESSABLE EPOXY COMPOSITIONS

[75] Inventor: James V. Crivello, Clifton Park, N.Y.

[73] Assignee: General Electric Company, Schenectady, N.Y.

[ * ] Notice: The portion of the term of this patent subsequent to Nov. 6, 1996, has been disclaimed.

[21] Appl. No.: 152,424

[22] Filed: May 22, 1980

Related U.S. Application Data

[60] Division of Ser. No. 67,027, Aug. 16, 1979, Pat. No. 4,283,312, which is a continuation-in-part of Ser. No. 861,128, Dec. 16, 1977, which is a continuation-in-part of Ser. No. 781,785, Mar. 28, 1977, abandoned, which is a continuation-in-part of Ser. No. 689,247, May 24, 1976, abandoned, which is a continuation-in-part of Ser. No. 638,982, Dec. 9, 1975, Pat. No. 4,058,401, which is a continuation-in-part of Ser. No. 638,994, Dec. 9, 1975, Pat. No. 4,069,055.

[51] Int. Cl.$^3$ .................. B29D 23/00; B29C 27/26
[52] U.S. Cl. .................................................... 264/137
[58] Field of Search ...................................... 264/137

[56] References Cited

U.S. PATENT DOCUMENTS 3,943,020  3/1976  Ashton ............................ 264/137 X
4,173,551  11/1979  Crivello ....................... 260/37 EP X
4,244,765  1/1981  Tokuno ............................ 264/137 X Primary Examiner—Thomas P. Pavelko
Attorney, Agent, or Firm—William A. Teoli; James C. Davis, Jr.

[57] ABSTRACT

Aromatic onium salts, such as diaryliodonium salts, have been found to be effective thermal initiators for the polymerization of epoxy resins having a viscosity of up to about 100,000 centipoises at 25° C. when used in combination with copper salts. The processable epoxy resin composition can be used in filament winding and pultrusion applications.

2 Claims, No Drawings

HEAT CURABLE PROCESSABLE EPOXY COMPOSITIONS

This is a division, of application Ser. No. 67,027, filed Aug. 16, 1979 now U.S. Pat. No. 4,283,312 which is a continuation-in-part of my co-pending application Ser. No. 861,128, filed Dec. 16, 1977, which is a continuation-in-part of application Ser. No. 781,785, filed Mar. 28, 1977, now abandoned, which is a continuation-in-part application of application Ser. No. 689,247, filed May 24, 1976, now abandoned, which is a continuation-in-part of applications Ser. No. 638,982, now U.S. Pat. No. 4,058,401, pending application Ser. No. 638,983 and Ser. No. 638,994, now U.S. Pat. No. 4,069,055, filed concurrently on Dec. 9, 1975, which are continuation applications respectively of abandoned applications Ser. Nos. 466,374, 466,375 and 466,378, filed concurrently on May 2, 1974, where all the aforementioned applications are assigned to the same assignee as the present invention. The present invention relates to heat curable compositions comprising a cationically polymerizable organic material, such as an epoxy resin, and an effective amount of a diaryliodonium salt used in combination with a cocatalyst such as copper salt, an organic acid, or mixtures thereof.

As shown in my application Ser. No. 781,785, filed Mar. 28, 1977, now abandoned, diaryliodonium salts of the formula, $$[(R)_a(R^1)_bI]_c^+[MQ_d]^{-(d-e)}, \quad (I)$$

can be used in combination with a copper salt, such as copper benzoate to effect the thermal cure of an epoxy resin, where R is a monovalent aromatic organic radical, $R^1$ is a divalent aromatic organic radical, M is a metal or metalloid, Q is a halogen radical, a is a whole number equal to 0 or 2, b is a whole number equal to 0 or 1 and the sum of a+b is equal to 1 or 2, c=d-e, e equals the valence of M and is an integer equal to 2-7 inclusive and d>e and is an integer having a value up to 8.

I also have found that heat curable cationically polymerizable materials can be made by incorporating into epoxy resins, the diaryliodonium salt of formula (I) in combination with organic acids, such as aromatic organic carboxylic acids. In addition, I have further found that besides epoxy resins, other cationically polymerizable materials, such as cyclic ethers, lactones, lactams, cyclic acetals, etc., can be thermally cured with combinations of such organic acids, copper salts or mixtures thereof with iodonium salts of formula (I), or iodonium salts having a non-nucleophilic counterion such as perchlorate, $CF_3SO_3^-$ and $C_6H_5SO_3^-$. Again, where the cationically polymerizable material is a phenol-formaldehyde resin, urea-formaldehyde or melamine-formaldehyde, iodonium salts can be used having in addition to $MQ_d$ and the other non-nucleophilic counterions, halide counterions such as $Cl^-$, $Br^-$, $F^-$, $I^-$, phosphate, etc., as shown by Y in formula (II) below.

There is provided by the present invention, a curable composition comprising by weight (A) a cationically polymerizable organic material, and (B) from 1% to 35% of the curable composition of a catalyst selected from the class consisting of (i) a mixture of (a) a diaryliodonium salt of the formula $$[(R)_a(R^1)_bI]_c^+[Y]^-, \text{ and} \quad (II)$$

(b) from 0.01 part to 10 parts, per part of (a), of a copper salt, (ii) a mixture of (c) the diaryliodonium salt of formula (II)

(d) from 0.1 part to 15 parts, per part of (c), of organic acid, organic acid anhydride or mixtures thereof and (iii) a mixture of (e) the diaryliodonium salt of formula (ii)

(f) from 0.01 part to 10 parts, per part of (e) of the copper salt of (b), and (g) from 0.1 part to 15 parts, per part of (e), of the organic acid, organic acid anhydride or mixtures thereof of (d), where R, $R^1$, a, b and c are as previously defined, and Y is a counterion as defined above. Radicals included by R of formulas (I) and (II) can be the same or different aromatic carbocyclic radicals having from 6 to 20 carbon atoms, which can be substituted with from 1 to 4 monovalent radicals selected from $C_{(1-8)}$ alkoxy, $C_{(1-8)}$ alkyl, nitro, chloro, etc. R is more particularly, phenyl, chlorophenyl, nitrophenyl, methoxyphenyl, pyridyl, etc. Radicals included by $R^1$ of formulas (I) and (II) are divalent radicals such as

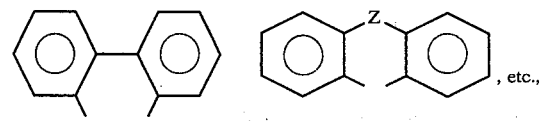

where Z is selected from —O—, —S—,

$(CH_2)_n$,

$R^2$ is $C_{(1-8)}$ alkyl or $C_{(6-13)}$ aryl, and n is an integer equal to 1-8 inclusive.

Metal or metalloids included by M of formulas (I) and (II) are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc., and metalloids such as B, P, As, etc. Complex anions included by $MQ_d^{-(d-e)}$ are, for example $BF_4^-$, $PF_6^-$, $AsF_6^-$, $SbF_6^-$, $FeCl_4^=$, $SnCl_6^-$, $SbCl_6^-$, $BiCl_5^=$, etc.

Iodonium salts included by formulas (I) and (II) are, for example,

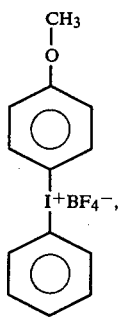
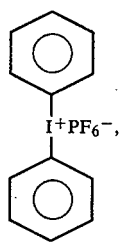

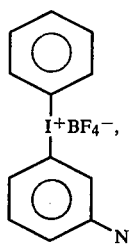
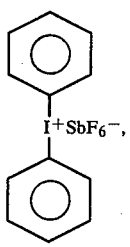

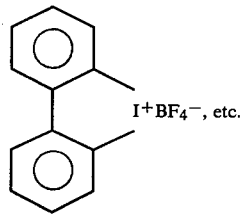

Iodonium salts of formula (I) can be made by the procedure in Crivello U.S. Pat. No. 3,981,897, assigned to the same assignee as the present invention, where contact between an aryl halonium bisulfate and the corresponding hexafluoro acid or salt can be effected under aqueous conditions. Iodonium salts of formulas (I) and (II) also can be made by the procedures described by O. A. Ptitsyna, M. E. Pudecva et al, Dokl., Akad. Nauk, SSSR, 163 383 (1964); Dokl., Chem., 163 671 (1965), F. Marshall Beringer, M. Drexler, E. M. Gindler, etc., J. Am. Chem. Soc., 75 2705 (1953).

Copper salts which can be used include, for example, Cu(I) salts such as copper halides, e.g., Cu(I) chloride etc; Copper (II) salts such as Cu(II) benzoate, Cu(II) acetate, Cu(II) stearate, Cu(II) gluconate, Cu(II) citrate, etc.

Organic acids and organic acid anhydrides which have been found effective in combination with the diaryliodonium salts of formulas (I) and (II) are included by the formulas, $$R^3COH;$$

$$R^4(X)_f(J)_g,$$

where $R^3$ is a monovalent organic radical selected from $C_{(1-8)}$ alkyl and $C_{(6-13)}$ aryl, $R^4$ is a polyvalent organic radical selected from $C_{(2-8)}$ aliphatic and $C_{(6-13)}$ aryl, X is selected from carboxy and sulfonate, J is

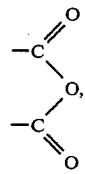

f is an integer equal to 0 to 4 inclusive, g is equal to 0 to 2 and when g is 0, f is equal to 2 to 4, and when g is 1, f is equal to 1 or 2. Some of the organic acids and organic acid anhydrides which can be used are, for example, aliphatic carboxylic acids such as acetic acid, 2-ethylhexanoic acid, hexanoic acid, oleic acid, stearic acid, palmitic acid, succinic acid, azeleic acid, etc.; aromatic carboxylic, for example, benzoic acid, salicylic acid, terephthalic acid, phthalic acid, trimellitic acid, trimellitic anhydride, pyromellitic dianhydride, o-toluic acid; sulfonic acids such as benzene sulfonic acid, p-toluene sulfonic acid, 4-nitrobenzene sulfonic acid, etc.

The term "epoxy resin" as utilized in the description of the cationically polymerizable compositions of the present invention, includes any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenolformaldehyde resin (Novolak resin) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxysiloxane resins, epoxy-polyurethanes and epoxy-polyesters. Such polymers usually have epoxy functional groups at the ends of their chains. Epoxysiloxane resins and method for making are more particularly shown by E. P. Plueddemann and G. Fanger, J. Am. Chem. Soc. 80 632-5 (1959). As described in the literature, epoxy resins can also be modified in a number of standard ways such as reaction with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,840; 3,567,797; 3,677,995; etc. Further coreactants which can be used with epoxy resins are hydroxy terminated flexibilizers such as hydroxy terminated polyesters, shown in the Encyclopedia of Polymer Science and Technology, Vol. 6, 1967, Interscience Publishers, New York, pp. 209-271 and particularly p. 238.

Included by the thermosetting organic condensation resins of formaldehyde which can be used in the practice of the present invention are, for example, urea type resins, such as $[CH_2=N-CONH_2]_x.H_2O,$
$[CH_2=NCONH_2]_x.CH_3COOH,$

[CH$_2$=NCONHCH$_2$NHCONHCH$_2$OH]$_x$;
phenol-formaldehyde type resin, such as

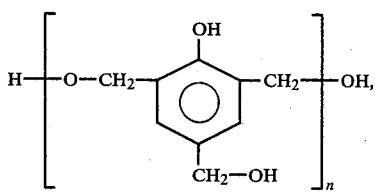

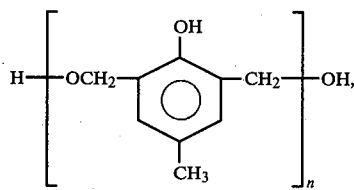

where x and n are integers having a value of 1 or greater;

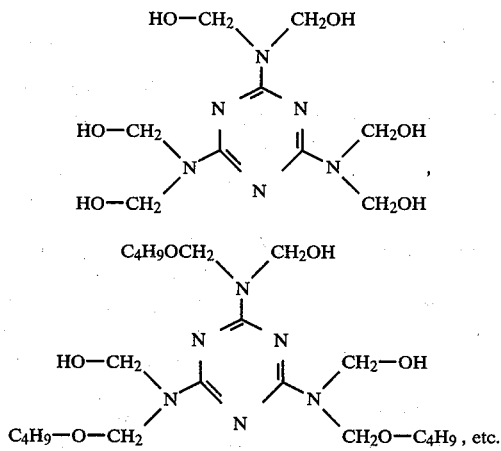

In addition, there can be used melamine thiourea resins, melamine, or urea aldehyde resins, cresol-formaldehyde resins and combinations with other carboxy, hydroxyl, amino and mercapto containing resins, such as polyesters, alkyds and polysulfides.

Some of the vinyl organic prepolymers which can be used to make the polymerizable compositions of the present invention are, for example, CH$_2$=CH—O—(C-H$_2$—CH$_2$O)$_{n'}$,—CH=CH$_2$, where n' is a positive integer having a value up to about 1000 or higher; multifunctional vinylethers, such as 1,2,3-propane trivinylether, trimethylolpropane trivinylether, prepolymers having the formula,

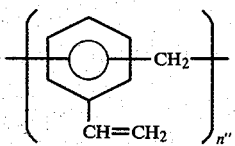

and
low molecular weight polybutadiene having a viscosity of from 200 to 10,000 centipoises at 25° C., etc. Products resulting from the cure of such compositions can be used as printing inks and other applications typical of thermosetting resins.

A further category of the organic materials which can be used to make the polymerizable compositions are cyclic ethers which are convertible to thermoplastics. Included by such cyclic ethers are, for example, oxetanes such as 3,3-bis-chloromethyloxetane, alkoxyoxetanes as shown by Schroeter U.S. Pat. No. 3,673,216, assigned to the same assignee as the present invention; oxolanes such as tetrahydrofuran, oxepanes, oxygen containing spiro compounds, trioxane, dioxolane, etc.

In addition to cyclic ethers there are also included cyclic esters such as β-lactones, for example propiolactone, cyclic amines, such as 1,3,3-trimethyl-azetidine and organosilicon cyclics, for example, materials included by the formula,

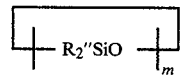

where R" can be the same or different monovalent organic radical such as methyl or phenyl and m is an integer equal to 3 to 8 inclusive. An example of an organosilicon cyclic is hexamethyl trisiloxane, octamethyl tetrasiloxane, etc. The products made in accordance with the present invention are high molecular weight oils and gums.

The heat curable compositions of the present invention can be made by blending the polymerizable organic material with at least an effective amount (i.e. at least about 0.1% by weight) of the diaryliodonium salt and in further combination, as previously defined, with the other cocatalysts such as the copper salt, organic acid, organic acid anhydride, etc. The resulting curable composition can be in the form of a varnish having a viscosity of from 1 to 100,000 centipoises at 25° C. or a free flowing powder, depending upon the nature of the cationically polymerizable organic material. The curable compositions can be applied to a variety of substrates by conventional means and cured to the tack-free state within 0.5 to 20 minutes, depending upon the temperature employed.

In certain instances, an organic solvent, such as nitromethane, acetonitrile, can be used to facilitate the mixing of various ingredients. The diaryliodonium salts can be formed in situ if desired. In addition, the curable compositions may contain inactive ingredients, such as silica, talc, clay, glass fibers, extenders, hydrated alumina, carbon fiber process aids, etc., in amounts of up to 500 parts of filler per 100 parts of cationically polymerizable organic material. The curable compositions can be applied to such substrates as metal, rubber, plastic, molded parts or films, paper, wood, glass, cloth, concrete, ceramic, etc.

Some of the applications in which the curable compositions of the present invention can be used are, for example, protective, decorative and insulating coatings, pitting compounds, printing inks, sealants, adhesives, molding compounds, wire insulation, textile coatings, laminates, impregnated tapes, varnishes, etc.

In order that those skilled in the art will be better able to practive the invention, the following examples are given by way of illustration and not by way of limitation. All parts are by weight.

EXAMPLE 1

Various blends of Shell Epon 828, bisphenol-A-diglycidyl ether, and a diaryliodonium-Cu(II) salt catalyst were heated for about 5 minutes to determine their respective cure temperatures, "CT". A wide variety of diaryliodonium $MQ_d$ salts of formula (I) in combination with several Cu(II) salts were utilized. The following table shows the results obtained where the weight percent is shown of diaryliodonium salt and the Cu(II) salt in the respective blends, based on total weight of mixture, and "Ph" is phenyl.

| Iodonium Salt (2%) | Cu(II) Salt (WT %) | CT(°C.) |
|---|---|---|
| $Ph_2IAsF_6$ | None | 215 |
| $Ph_2IAsF_6$ | benzoate (0.04) | 112 |
| $Ph_2IAsF_6$ | benzoate (0.5) | 105 |
| $Ph_2ISbF_6$ | None | 171 |
| $Ph_2ISbF_6$ | benzoate (0.5) | 105 |
| $Ph_2IBF_4$ | None | 210 |
| $Ph_2IBF_4$ | benzoate (0.5) | 135 |
| $Ph_2IAsF_6$ | stearate (0.2) | 148 |
| $Ph_2IAsF_6$ | stearate (0.5) | 115 |
| $(4\text{-}t\text{-}butPh)_2IAsF_6$ | benzoate (0.5) | 106 |
| $(4\text{-}Cl\text{-}Ph)_2IAsF_6$ | benzoate (0.5) | 106 |
| $(4\text{-}CH_3\text{-}Ph)_2IAsF_6$ | benzoate (0.5) | 108 |
| $Ph_2IAsF_6$ | acetate (0.5) | 142 |

In the above table, cure was determined by applying the curable mixture onto a steel substrate and heating it in an oven until the applied curable mixture formed a tack-free cured film.

EXAMPLE 2

A mixture of bisphenol-A diglycidyl ether and 3% by weight of diphenyliodonium hexafluoroarsenate was respectively blended with 3% of benzoic acid and 6 and 10% of trimellitic anhydride by weight. The resulting curable mixtures were then heated at a rate of 10° C. per minute to determine the minimum temperature required to gel the bis-epoxide. It was found that a temperature of 225° C. was required to gel the bis-epoxide when the mixture was free of aromatic carboxylic acid. However, the 3% by weight benzoic acid mixture gelled at 120° C., while the 6 and 10% trimellitic anhydride mixture gelled at 150°–160° C., respectively.

EXAMPLE 3

A variety of curable mixtures were prepared utilizing 3,4-epoxycyclohexylmethyl-3',4'-epoxycyclohexane carboxylate, 3% by weight of diphenyliodonium hexafluoroarsenate and a range of between about 3%–6% by weight of various organic acids. The mixtures were heated in an oil bath to determine the respective gel times. The temperature of the oil bath was 170° C. The following results were obtained, where "Acid" signifies the organic acid or organic acid anhydride employed.

| Acid | Weight (%) | Gel Time(sec) |
|---|---|---|
| None | 0 | >900 |
| Acetic | 6 | 170 |
| Stearic | 6 | 215 |
| Benzene sulfonic | 6 | 135 |
| Trimellitic anhydride | 6 | 160 |
| Trimellitic anhydride | 10 | 150 |
|  | 6 | 300 |
| CH₃-C(CH₃)(H)-C₆H₄-COOH | 3 | 225 |
| HO-C₆H₄-COOH | 6 | 165 |
| NO₂-C₆H₃(NO₂)-COOH | 3 | 225 |
| OH-C₆H₃-COOH | 6 | 165 |
| Cl-C₆H₃(Cl)-COOH | 6 | 115 |
| HO-C₆H₃(OH)-COOH | 6 | 123 |

The above results show that a significant reduction in gel time was achieved when the organic acid was utilized in combination with the diaryliodonium salt.

EXAMPLE 4

There were added 0.2 part of diphenyliodonium hexafluoroarsenate, 0.1 part of benzoic acid and 0.05 part copper benzoate to 10 parts of an allyl ether resole condensation product of phenol and formaldehyde containing multifunctional hydroxy methyl groups (Methylon 75108 resin of the General Electric Company). The mixture was stirred in an oil bath at 120° C. The mixture gelled and hardened at 120° C. to a rigid crosslinked mass within 5 minutes. The composition is useful as a potting material for electrical components.

EXAMPLE 5

There was added 0.1 part of copper benzoate and 0.2 part of diphenyliodonium hexafluoroarsenate to 10 parts caprolactone. The mixture was heated for 20 minutes at 120° C. The resulting highly viscous reaction mixture was poured into methanol. There was obtained 9.5 parts polycaprolactone having an intrinsic viscosity in methylene chloride of 0.4 dl/g.

EXAMPLE 6

Ten parts of a mixture of 3% by weight of diphenyliodonium hexafluoroarsenate, 6% by weight of copper benzoate, 51% by weight of cycloaliphatic bisepoxide (CY-179, of the Ciba Geigy Company) and 40% by weight of hydroxyl terminated polyester (R-101-110, of the Hooker Chemical Company) was placed in an aluminum cup. The mixture was heated for 10 minutes at 130° C. On cooling, there was obtained a rubbery material capable of being flexed 180° C. without breaking.

EXAMPLE 7

Graphite cloth (Morganite I produced by the Whittaker Corporation, Costa Messa, Calif.) was impregnated with the following mixture:

| | |
|---|---|
| Epoxy cresol novolac (ECN 1299) of the Ciba Geigy Co. | 20 parts |
| Diphenyliodonium hexafluoroarsenate | 3 parts |
| Diglycidyl ether of the bisphenol-A (Epon 828) of the Shell Chemical Company | 80 parts |
| Trimellitic anhydride | 10 parts |
| Copper benzoate | 1 part |

The cloth was then cut into 4"×6" pieces. A four layer laminate was made from the aforementioned piece. The laminate was then pressed at 165°–170° C. at 50 psi for 3 minutes. There is obtained a rigid cured solvent resistant graphite fiber reinforced laminate having excellent mechanical properties.

EXAMPLE 8

A molding compound was made by mixing 394 parts of a granulated filler-epoxy preblend, 18.75 parts of trimellitic anhydride, 3.75 parts of diphenyliodonium hexafluoroarsenate, 0.15 part of copper stearate, 9 parts of powdered carnauba wax 6 parts of powdered Cornelius wax, and 75 parts of ¼" chopped glass fiber. The filler-epoxy preblend was based on the use of 8,365 parts of hydrated alumina and 1,050 parts of titanium dioxide, 3,500 parts of pulverized Epi-Rez SU-8 (an epoxy novolac resin of the Celanese Chemical Company) and 875 parts of pulverized Epon 1009 (a BPA epoxy resin of the Shell Chemical Company). The filler-epoxy preblend was initially sintered, followed by compounding it with a Sterling extruder.

The molding compound was granulated for evaluation after it had been sheeted on a roll mill. The granulated molding material free of particles finer than 20 mesh was molded in accordance with ASTM D955 for 3–5 minutes at 350° F. at a pressure of 2000–3000 psi. There were obtained ASTM discs and dog bone specimens providing the following properties:

| | Dry Powder | Preforms (preheated) | Test Method |
|---|---|---|---|
| Molding Properties | | | |
| Molding Temp. | 350° F. | 350° F. | |
| Cure Cycle | 45 sec. | — | |
| Mold Shrinkage - 5 in bars | | 3.6 mil/in | D955 (ASTM) |
| Physical Properties | | | |
| Specific Gravity | | 1.83–1.85 | D570 |
| Hardness, Rockwell | M88±10 | M110±4 | D785 |
| Mechanical Properties | | | |
| Tensile Strength (psi) | 4300±300 | 5100±600 | D638 |
| Flexural Strength (psi) | 10900±400 | 9800±500 | D790 |
| Compressive Strength (psi) | 18100±500 | 17000±1500 | D695 |
| Drop Ball (½ lb, in) | 10±1 | 10±1 | |
| Notched Izod (ft-lb/in) | 0.37±.04 | 0.53±.1 | D256 |
| Thermal Properties | | | |
| HDT | 460±7° F. | 435±13° F. | D648 |
| Electrical Properties | | | |
| Arc Resistance (sec) | 199±1 | 196±2 | D495 |

EXAMPLE 9

There were formulated, 33.5 parts of platy talc, 33.5 parts of hydrated alumina, 13 parts of trimellitic anhydride, 3.9 parts of diphenyliodonium hexafluoroarsenate, 3.6 parts of powdered paraffin wax and 0.6 part of stearic acid with 268 parts of a granulated preblend of hydrated alumina, platy talc and epoxy resin, and 145 parts of epoxy coated glass fiber. The granulated preblend of platy talc and hydrated alumina was initially prepared from a mixture of 140 parts of platy talc, 140 parts of hydrated alumina, 45.75 parts of Epon 1001 BPA epoxy resin of the Shell Chemical Company, and 48.75 parts of ECN 1299, an epoxy cresol novolac resin of the Ciba-Geigy Chemical Company. The epoxy coated glass fiber was prepared from a mixture of 75 parts of chopped glass fibers, 32.5 parts of Epon 1001 and 32.5 parts of ECN 1299.

The above formulation was then dry blended and roll milled at temperatures in the range of between 30°–90° C. for several minutes. The resulting mixture was then further tumble blended with additional stearic acid after being granulated.

Several ASTM specimens were prepared in accordance with the procedures of Example 8. The resulting specimens provided the following properties:

| | | Test Method |
|---|---|---|
| Molding Properties (Compression) | | |
| Molding temperature | 350° F. | |
| Cure cycle | | |
| - Dry powder | 60 sec. | |
| - Preforms (preheated) | 40 sec. | |
| Mold shrinkage | | |
| - 5 × ½ × ½ bars (mils/in) | 2.1±0.1 | D955 (ASTM) |
| Physical Properties | | |
| Specific gravity | 1.93 | |
| Water absorption | | D570 |
| - 25° C. (24 hrs, %) | 0.06 | |
| - 100° C. (2 hrs, %) | 0.22 | |
| Burning characteristics | V-O | UL-94 |
| Hardness, Rockwell | M97±10 | D785 |
| Mechanical Properties | | |
| Tensile strength (psi) | 5700±1700 | D638 |
| Flexural strength (psi) | 11,000±2000 | D790 |
| Flexural modulus (psi × 10⁶) | 1.84±0.14 | |
| Compressive strength (psi) | 16,000±1900 | D695 |
| Notched izod (ft-lb/in) | 0.57±0.01 | D256 |
| Thermal Properties | | |
| Thermal coefficient of expansion | 14. | |
| Heat deflection temperature (265 psi) | 475° F. | |
| - Flex. strength (% retention) | 9800±1200 (91%±22%) | |
| - Flex. modulus (% retention) | 1.84±0.09 (100%±8%) | |
| Electrical Properties | | |
| Arc resistance (sec) | 199±5 | |

Although the above examples are directed to only a few of the very many variables included by the curable compositions of the present invention, it should be understood that the curable compositions can comprise a much broader variety of cationically polymerizable organic materials, diaryliodonium salts, copper salts and organic acids as shown in the description preceding these examples. For example, the heated curable compositions of the present invention also include one component epoxy formulations useful in pultrusion, filament winding and bulk molding applications. The epoxy formulations useful in these applications can have a viscosity at from about 100 centiposies to 100,000 centiposies at 25° C. and can be used in combination with an effective amount of diaryliodonium hexafluoro salts of formula (I) and copper salts as previously defined.

EXAMPLE 10

A filament winding formulation is made by mixing together 96.5 parts of 3,4-epoxycyclohexylmethyl-3',4'-epoxy cyclohexane carboxylate, 3 parts of diphenyliodonium hexafluoroarsenate and 0.5 part of copper stearate.

The above formulation is used to filament wind a cylindrical test piece reinforced with glass fiber. There is employed a micro-computer controlled filament winder manufactured by McClean-Anderson Inc., fitted with a 3¾ in. diameter hollow stainless steel mandril and fed by a traversing carriage. Eighteen strands of glass roving are passed from their creels through a bath of the resin formulation at 25° C. The wetted strands are then passed over a metering drum through a delivery die onto a mandril. A winding angle of 54° is used and wound to produce a ⅜ in. wall thickness. There is obtained a 15 in. cylinder upon completion of the winding which is placed in a forced air over for 15 minutes maintained at a temperature of 150° C. The mandril is then separated from the resulting structure to produce a fully cured part. Similar results are obtained when the diphenyliodonium salt concentration is reduced to 1.5 part.

The filament wound part is found to have excellent hoop and axial compressive strength. The filament wound structures are useful for making automative and aircraft structural components, rocket casings, etc.

EXAMPLE 11

A resin formulation is prepared consisting of 98.5 parts of epoxy resin of Example 10, 2 parts of diphenyliodonium hexafluoroarsenate, 0.5 part of copper stearate and 1 part of glycerol monostearate.

Glass roving passed through the above formulation is maintained at 60° C. The treated fibers are passed over guides to effect the removal of excess resin and then directed into a heated cylindrical die. The die head has 4 heating zones maintained at the following temperatures: Zone 1, 120° C.; zone 2, 150° C.; zone 3, 170° C.; zone 4, 180° C.

There is obtained a fully cured ⅜ in. reinforced epoxy resin rod. The rod is pulled through the die at a rate of 15-20 feet-min., using a pair of linked caterpiller clamps and the rod is automatically cut into 8 foot lengths.

The above procedure is repeated, except that there is used Epon 828 as the epoxy resin. The following properties are obtained when the physical properties of the rod are tested.

| | |
|---|---|
| tensile strength | 138,00 psi |
| tensile modulus | $6.03 \times 10^6$ psi |
| flexural strength | 137,000 psi |
| flexural modulus | $6.67 \times 10^6$ psi |

The above pultruded components are used as reinforcing rods, stand-off insulators, fishing poles, automotive and aircraft structural members, corrosion resistant stirring shafts, etc.

For purposes of practicing the method of the present invention there can be used a temperature in the range of 80° C. to 200° C.

There are also shown in my application Ser. No. 861,127, filed Dec. 16, 1977, now abandoned, Curable Organic Resin Compositions and Foaming Method, and in application Ser. No. 841,351, filed Oct. 12, 1977, now abandoned, Heat Curable Compositions and Method of Curing Same, additional diaryliodonium organic resin compositions, where both applications are assigned to the same assignee as the present invention.

What I claim as new and desire to secure by Letters Patent of the United States is:

1. A filament winding method for making a reinforced composite structure which comprises
   (1) passing glass fibers through a bath of a curable epoxy resin,
   (2) winding the resulting treated fibers onto a mandril,
   (3) heating the resulting wound fibers until the resin is cured,
   (4) separating the mandril from the resulting composite structure, where the curable epoxy resin is a composition comprising
   (A) an epoxy resin having a viscosity of from about 100 to 100,000 centipoises at 25° C.
   (B) an effective amount of aromatic iodonium salt of the formula, $[(R)_a(R^1)_bI]_c^+[MQ_d]^{-(d-e)}$, and (C an effective amount of a copper salt, where R is a monovalent aromatic organic radical, $R^1$ is a divalent aromatic organic radical, M is a metal or metalloid, Q is a halogen radical, a is a whole number equal to 0 or 2, b is a whole number equal to 0 or 1 and the sum of a+b is equal to 1 or 2, c=d-e, e equals the valence of M and is an integer equal to 2-7 inclusive and d>e and is an integer having a value up to 8.

2. A pultrusion method for making reinforced epoxy structures which comprises,
   (1) passing glass fibers into a curable epoxy resin composition,
   (2) guiding the resulting treated glass fibers through a heated die,
   (3) periodically cutting the reinforced epoxy structure emerging from the heated die at a rate sufficient to provide reinforced epoxy structures having a predetermined length, where the curable epoxy resin is a composition comprising
   (A) an epoxy resin having a viscosity of from about 100 to 100,000 centipoises at 25° C.
   (B) an effective amount of aromatic iodonium salt of the formula, $[(R)_a(R^1)_bI]_c^+[MQ_d]^{-(d-e)}$, and (C) an effective amount of a copper salt, where R is a monovalent aromatic organic radical, $R^1$ is a divalent aromatic organic radical, M is a metal or metalloid, Q is a halogen radical, a is a whole number equal to 0 or 2, b is a whole number equal to 0 or 1 and the sum of a+b is equal to 1 or 2, c=d-e, e equals the valence of M and is an integer equal to 2-7 inclusive and d>e and is an integer having a value up to 8.

* * * * *